(12) United States Patent
Griffin et al.

(10) Patent No.: US 7,776,251 B2
(45) Date of Patent: Aug. 17, 2010

(54) METHOD OF MAKING SOUND INSULATION WITH HIGH LOFT

(76) Inventors: Rowland Griffin, 708 Ridge Rd., Pocono Summit, PA (US) 18346; John P. Field, 14 Koeck Rd., Columbia, NJ (US) 07832

(*) Notice: Subject to any disclaimer, the term of this patent is extended or adjusted under 35 U.S.C. 154(b) by 1058 days.

(21) Appl. No.: 11/363,524

(22) Filed: Feb. 28, 2006

(65) Prior Publication Data

US 2006/0234590 A1    Oct. 19, 2006

Related U.S. Application Data

(63) Continuation-in-part of application No. 10/414,498, filed on Apr. 16, 2003, now abandoned.

(51) Int. Cl.
*B27N 1/00* (2006.01)
*D01D 5/08* (2006.01)
*D04H 1/40* (2006.01)
*D04H 3/00* (2006.01)

(52) U.S. Cl. .................. 264/518; 264/103; 264/555

(58) Field of Classification Search ............ 264/103, 264/211, 211.14, 518, 555
See application file for complete search history.

(56) References Cited

U.S. PATENT DOCUMENTS

| | | | |
|---|---|---|---|
| 4,042,740 | A | 8/1977 | Krueger |
| 4,103,058 | A | 7/1978 | Humlicek |
| 5,298,694 | A | 3/1994 | Thompson et al. |
| 5,667,749 | A | 9/1997 | Lau et al. |
| RE36,323 | E | 10/1999 | Thompson et al. |
| 6,217,691 | B1 | 4/2001 | Vair, Jr. et al. |
| 6,220,388 | B1 | 4/2001 | Sanborn |
| 6,358,592 | B2 | 3/2002 | Vair, Jr. et al. |
| 6,364,647 | B1 | 4/2002 | Sanborn |
| 6,371,749 | B2 | 4/2002 | Thompson et al. |
| 6,534,572 | B1 | 3/2003 | Ahmed et al. |

FOREIGN PATENT DOCUMENTS

| | | |
|---|---|---|
| JP | 9076387 | 3/1997 |
| JP | 9095169 | 4/1997 |

*Primary Examiner*—Leo B Tentoni
(74) *Attorney, Agent, or Firm*—Shoemaker and Mattare

(57) ABSTRACT

Sound insulation core material is made by melt-blowing a polypropylene resin having a hydroxystearamide wax additive to produce a fibrous mass having improved loft. The core material is encased between outer layers of spun-bond polyethylene fibers by longitudinal seams and transverse seams to form a product suitable for use in dishwashers.

7 Claims, 2 Drawing Sheets graph 1: 100 mm tube
graph 2: 29 mm tube

Frequency (Hz)

METHOD OF MAKING SOUND INSULATION WITH HIGH LOFT

REFERENCE TO EARLIER APPLICATIONS

This Application is a continuation-in-part of U.S. patent application Ser. No. 10/414,498, filed Apr. 16, 2003, now abandoned.

BACKGROUND OF THE INVENTION

The production cost of a machine includes the cost of insulation, and the weight of the insulation may be significant as well. Therefore, it is desirable to reduce the cost and weight of the insulation in a machine, while providing good sound attenuation over a broad frequency spectrum.

SUMMARY OF THE INVENTION

An object of the invention is to improve sound insulation of machines and other mechanical devices.

Another object is to reduce the weight and cost of such insulation.

It is also an object of the invention to provide sound insulation, made of polypropylene fibers, which has as much loft as possible, and a density not greater than about 1.5 lb/ft³.

These and other objects are attained by the sound insulation material described below. The material is a laminate of at least three different layers of polyolefin fibers.

The center layer is melt-blown polypropylene sound insulation. Its has low density, comprising random fibers which are loosely interconnected. High loft is obtained by adding a hydroxystearamide wax, to the melted polypropylene resin in such a way that it blooms to the surface of the fibers when they are produced by melt blowing and inhibits thermal bonding between fibers. The consequent reduction of thermal bonding at the surface of the fibers produces improved loft.

Other features and advantages of the invention will become apparent from the following description of the preferred embodiments, which refers to the accompanying drawings.

BRIEF DESCRIPTION OF THE DRAWINGS

The invention is described in detail below with reference to the following figures, wherein.

DETAILED DESCRIPTION OF THE PREFERRED EMBODIMENT

Figure 1:
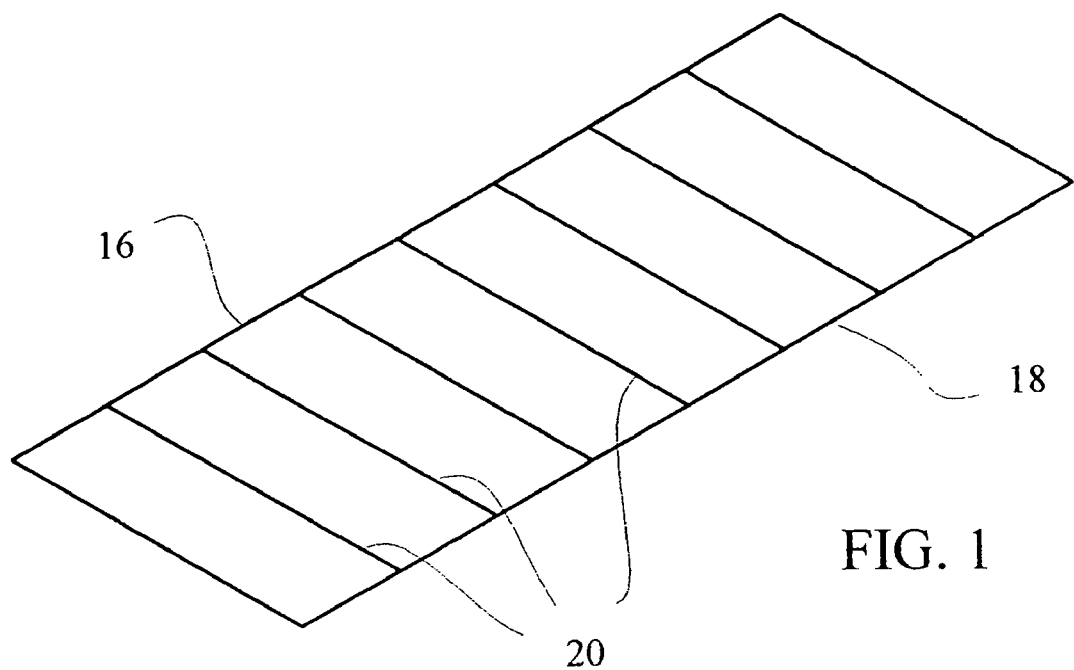
FIG. 1 is an isometric view of an indefinite length of sound insulation embodying the invention.
Figure 2:
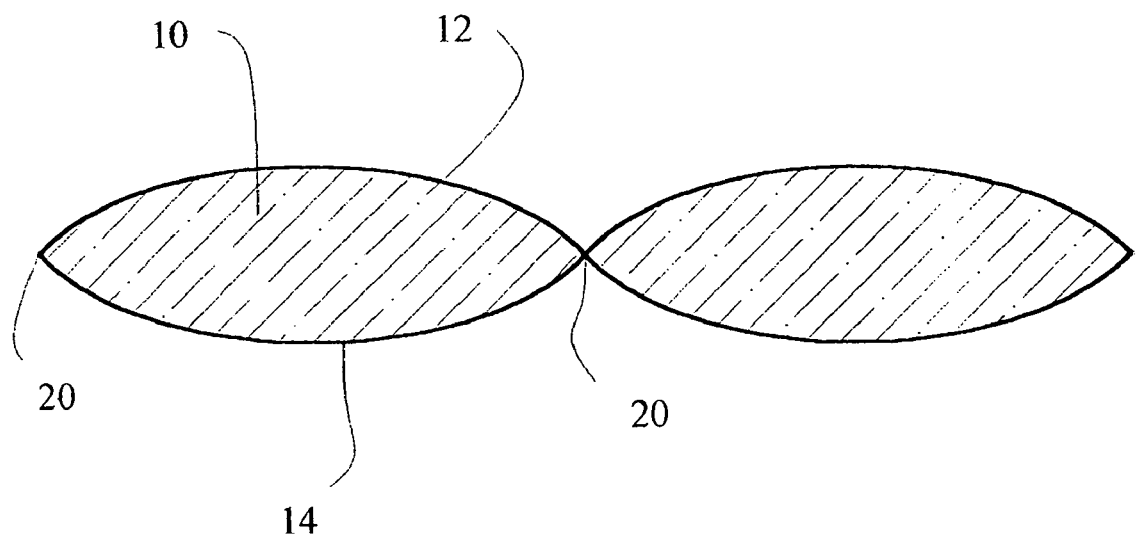
FIG. 2 is cross-sectional view thereof, taken on a plane parallel to the length of the insulation.

As shown in FIGS. 1 and 2, an indefinite length of sound insulation according to the invention comprises a series of cells each containing a fibrous core layer 10 contained between outer layers 12 and 14, shown in FIG. 2.

One outer layer 12 is spun-bond polypropylene. The preferred material (PGI NW 0050-021N SBPP) has a basis weight of about 0.45 ounces per square yard, and an air permeability of about 1000 cfm per square foot of material, at standard test conditions (ASTM C423).

The opposite layer 14 is a melt-blow polypropylene scrim. The preferred material has a basis weight of about 0.5-0.6 ounces per square yard, and an air permeability of about 80-100 cfm per square foot.

The core 10 is made of a high-loft material made of melt-blown polyolefin (preferably polypropylene) fibers using standard equipment. The layers are united at their longitudinal edges by longitudinal seams 16, 18, and are also interconnected by transverse seams 20 at regular intervals of about ten inches. Examples 2 and 3 below embody the invention.

To achieve high loft and low density, a hydroxystearamide wax, preferably Paracin 285 (an N,N'ethylene-bis-12-hydroxy-stearamide, sold by CasChem. Inc., Bayonne, N.J.) is added to the melted polypropylene resin prior to extrusion of the fibers in an amount such that the wax blooms to the surface of the fibers when they are produced in a melt blowing process, and inhibits thermal bonding between the fibers. The sufficient amount of Paracin is not more than 1% of the weight of the resin, preferably 0.4% to 0.6%.

Example 1

To provide a basis for comparison, a layer of meltblown polypropylene was made by extruding Sunoco CP15000P resin through an array of 2160 holes each having a diameter of 0.014 inch at a temperature of 230° C. and a pressure of 200 psi, discharging into air at ambient conditions onto a surface moving at 20 ft/min. The resulting product was tested and found to have the properties in the table below.

| | |
|---|---|
| Layer thickness: | 0.25 inch |
| Basis weight: | 33 g/ft³ |
| Density: | 3.5 lb/ft³ |
| Average fiber diameter: | 2-4 micron |
| Fiber diameter range: | 0.5-10 micron |
| Sound attenuation: | Unacceptable |

Example 2

A second layer of meltblown polypropylene was made be a process identical to that of Example 1, except that 0.6% Paracin 285 was added to the resin before extrusion. The following properties resulted:

| | |
|---|---|
| Layer thickness: | 0.50-0.75 inch |
| Basis weight: | 33 g/ft³ |
| Density | 1.5 lb/ft³ |
| Average fiber diameter: | 2-4 micron |
| Fiber diameter range: | 0.5-10 micron |
| Sound attenuation: | Excellent |

The sound attenuation in each example was determined by ASTM E1050-98 "Standard Test Method for Impedance and Absorption of Acoustical Materials".

We had originally thought that it would be necessary to reduce the MFR (melt flow rate) to improve loft, and that longer molecular chains would be needed to produce a springy product; however, we were surprised to find that, in Example 2, even with a high MFR (1500 lbs/hr), the Paracin additive produced both better production rates and better loft.

Example 3

Figure 3:
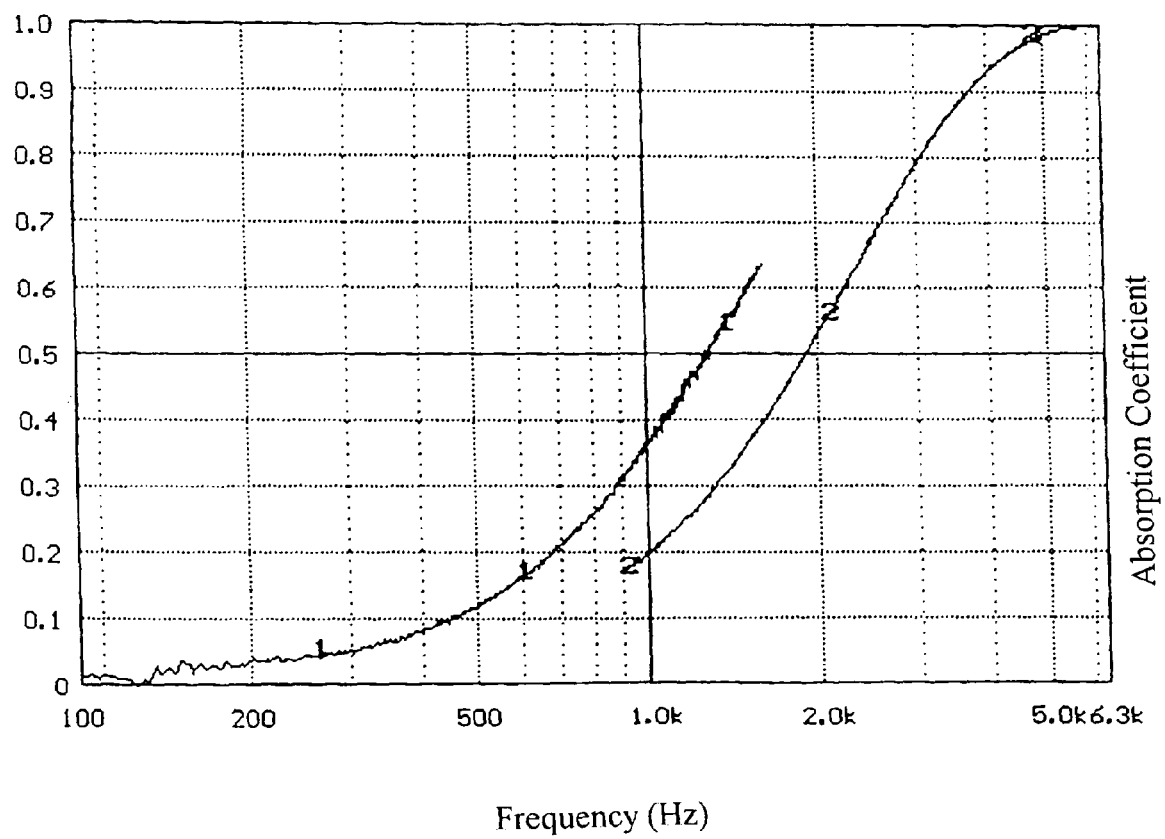
FIG. 3 is a graphical representation of sound attenuation characteristics of the embodiment of FIG. 1.

A core layers of the product of Example 2 was produced by blowing it onto a layer of spun-bond polypropylene as described above. Then a scrim layer of melt-blown polypropylene, as described above, was placed on top of the core layers. All three layers were interconnected by forming seams at the lateral edges of the product, and by making bonded transverse seams, extending across the product, at intervals of about ten inches. The seams were created by applying pressure with a seaming wheel against an anvil roll. Sound attenuation testing was conducted as in the previous example, and the data obtained appears in the graph of FIG. 3. Broad spectrum attenuation was observed.

The invention is not limited to the particular embodiment(s) described and depicted herein, rather only to the following claims.

We claim:

1. In a method of producing sound insulation comprising a step of extruding a polypropylene resin through nozzles onto a moving surface at a temperature and pressure such that a melt-blown fiber mass results, the improvement comprising a step of adding a wax additive to the polypropylene before the extruding step, wherein said wax additive is a hydroxystearamide wax and is present in an amount sufficient to inhibit thermal bonding between fibers and thereby improve loft of the insulation, wherein the amount of said additive is no greater than 1.0% by weight of the amount of the resin.

2. The method of claim 1, wherein said temperature is about 230° C.

3. The method of claim 1, wherein said pressure is about 200 psi.

4. The method of claim 1, wherein the hydroxystearamide wax is N,N'ethylene-bis-12-hydroxy-stearamide.

5. The method of claim 4, wherein said temperature is about 230° C.

6. The method of claim 4, wherein said pressure is about 200 psi.

7. The method of claim 4, wherein the amount of said additive is 0.4% to 0.6% by weight of the amount of the resin.

* * * * *